(12) United States Patent
Nelson

(10) Patent No.: US 8,052,090 B1
(45) Date of Patent: Nov. 8, 2011

(54) HOIST SUPPORT REMOVABLY MOUNTABLE EXTERNALLY ONTO A HELICOPTER

(75) Inventor: Steven F. Nelson, Pelican Rapids, MN (US)

(73) Assignee: War Fighter Works, LLC, Las Vegas, NV (US)

( * ) Notice: Subject to any disclaimer, the term of this patent is extended or adjusted under 35 U.S.C. 154(b) by 406 days.

(21) Appl. No.: 12/455,191

(22) Filed: May 28, 2009

(51) Int. Cl.
    *B64D 1/12* (2006.01)
    *B64C 1/22* (2006.01)

(52) U.S. Cl. .................................. 244/137.4; 244/118.1

(58) Field of Classification Search ............... 244/17.27, 244/24–31, 54, 127, 137.4, 117 R, 118.1; 396/7, 12; 60/796, 797; 248/554–559, 629
See application file for complete search history.

(56) References Cited

U.S. PATENT DOCUMENTS 5,375,795 A * 12/1994 Strunk ........................ 244/118.5
6,199,793 B1 * 3/2001 Hainsworth et al. ........ 244/1 TD

* cited by examiner

*Primary Examiner* — Timothy D Collins
*Assistant Examiner* — Nicholas McFall
(74) *Attorney, Agent, or Firm* — Peter Loffler

(57) ABSTRACT

A support system attaches a hoist to the External Stores Support System of an aircraft by using a boom from which a first leg depends and is attached to a forward fitting. A second leg is attached to the boom via a collar and attaches to an aft fitting while a torque arm is pivotally attached to the collar via a support arm, the torque arm also attaches to a tie-down fitting. The legs are attached to their respective fittings using pins and the torque arm is bolted to the tie-down ring fitting. A hoist slip having a horn is attached to an end of the boom.

7 Claims, 2 Drawing Sheets

HOIST SUPPORT REMOVABLY MOUNTABLE EXTERNALLY ONTO A HELICOPTER

BACKGROUND OF THE INVENTION

1. Field of the Invention

The present invention relates to a hoist support apparatus for mounting various hoists thereto, the apparatus being quickly and removably attachable to an existing external stores support system found on a helicopter.

2. Background of the Prior Art

The use of helicopters for hoisting cargo into or out of the aircraft has been well known for a long time. The helicopter, by being able to fly over areas that may be impossible to reach by land or water vehicles, can reach areas that may be otherwise inaccessible. By being able to hover in place, the helicopter can remain relatively stationary and either hoist cargo, such as relief supplies, from the aircraft, or hoist victims up into the aircraft. The helicopter has proved it is an invaluable tool in many disasters both large and small.

However, the hoist systems known in the art suffer from certain shortcomings. Many hoist systems are mounted within the interior cabin of the aircraft taking up valuable real estate therein, thereby limiting the cargo or passengers that can be ferried as well as creating an obstruction within the aircraft for helicopter personnel. Many hoist systems are relatively permanent in their helicopter installation so that the real estate reduction and obstruction occasioned by the hoist system occurs irrespective of whether or not the helicopter is on a hoist requiring supply or rescue mission.

To lessen the impact of such internally mounted hoist systems, devices have been designed that allow the hoist system to pivot or otherwise fold up in order to reduce the space impact of the hoist system. While freeing up room in the aircraft and lessening the obstruction impact, such devices add substantial weight to the aircraft, limiting the helicopter's ability to transport cargo or passengers.

Other devices are relatively lightweight yet require substantial time and effort of up to thirty days to install the device onto the aircraft, including the need to perform permanent modifications to the original airframe, which modifications need to be performed by specialized personal. As has been recently seen in overwhelming natural disasters including Hurricane Katrina and the Asian Tsunami, the need to modify a large number of helicopters by a limited number of capable personal, dampened the availability of hoist capable helicopters onsite in the unfolding hours and days of the disasters. These delays had a substantial adverse effect on the rescue effort.

As a result, national interests, both civilian and military, have paid greater focus on acquiring larger numbers of hoist capable helicopters, yet such interests are finding the drawbacks associated with current helicopter hoist mount systems to be a daunting challenge.

What is needed is a device that can mount a hoist to a helicopter, which device overcomes the above mentioned shortcoming found in the art. Specifically, the mount system must be able to attach a wide variety of available hoists to the aircraft without the need to make major permanent changes to the airframe of the helicopter. Such a device must be able to be mounted to the helicopter quickly and easily without the need for highly specialized technicians to perform the installation. Such a device must not take away valuable real estate within the aircraft and must not create an undue obstruction burden. Ideally, such a device is relatively lightweight so that the aircraft can carry its typical payload.

SUMMARY OF THE INVENTION

The hoist support removably mountable externally onto a helicopter of the present invention addresses the aforementioned needs in the art by providing a hoist mount that quickly and easily mounts to a helicopter without the need to make major permanent modifications to the airframe of the helicopter and without the need the employ highly specialized personnel. The hoist support removably mountable externally onto a helicopter is relatively lightweight so as not to detract from the payload capability of the aircraft. The present invention, by being mounted onto an external surface of the aircraft, does not occupy any of the valuable real estate within the interior compartment of the helicopter and does not create an obstruction to passengers within the helicopter.

The hoist support removably mountable externally onto a helicopter of the present invention is comprised of a boom that has a first end, a second end, and a medial section. A first leg extends diagonally downwardly from the first end of the boom. A collar has an opening such that the boom passes through the opening of the collar. A second leg extends diagonally downwardly from the collar. A support arm extends outwardly from the collar. A torque arm is pivotally attached to the collar. A hoist slip that has a horn for receiving a hoist is attached to the second end of the boom. The first leg is attached to a forward fitting of the External Stores Support System of the helicopter, the second leg is attached to an aft fitting of the External Stores Support System, and the torque arm is attached to a tie-down ring fitting located immediately forward of the side door of the helicopter. The torque arm may come in more than one length and each such length may be variable. The first leg is attached to the boom via a cap.

BRIEF DESCRIPTION OF THE DRAWINGS

Similar reference numerals refer to similar parts throughout the several views of the drawings.

DESCRIPTION OF THE PREFERRED EMBODIMENT

Figure 1:
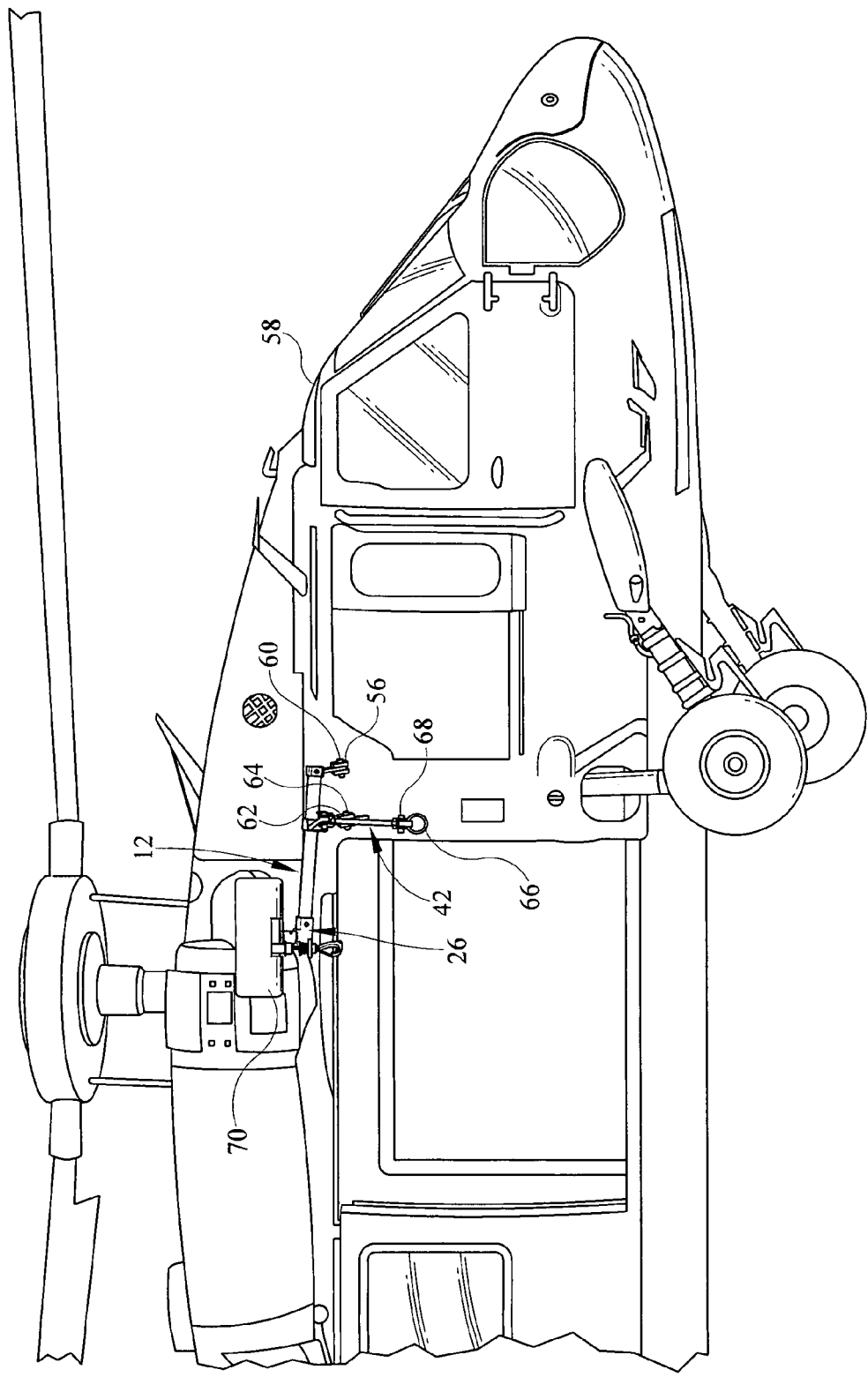
FIG. 1 is an environmental view of the hoist support removably mountable externally onto a helicopter of the present invention installed on the helicopter.
Figure 2:
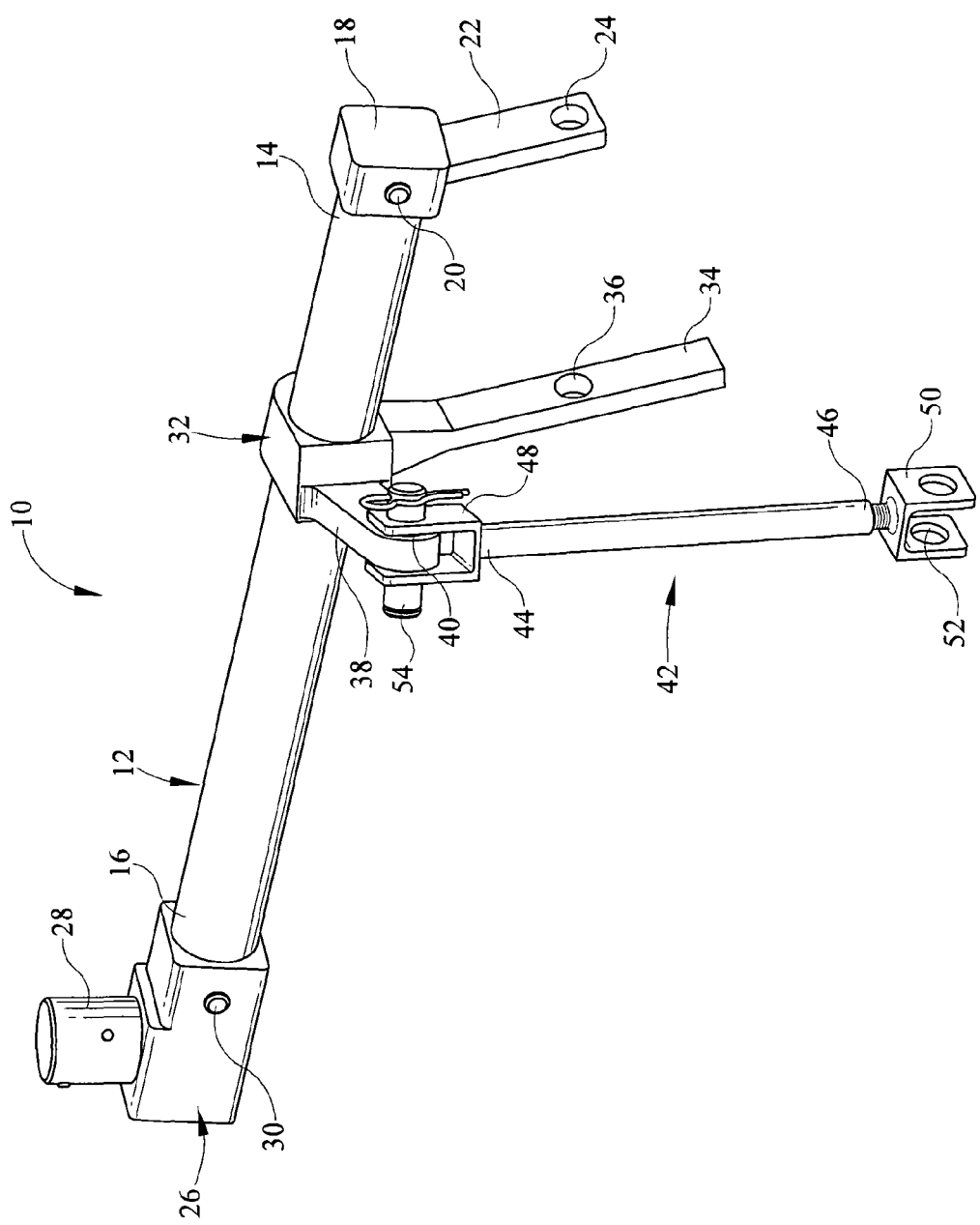
FIG. 2 is a perspective view of the hoist support removably mountable externally onto a helicopter utilizing a relatively short anti-rotation torque arm.

Referring now to the drawings, it is seen that the hoist support removably mountable externally onto a helicopter of the present invention, generally denoted by reference numeral 10, is comprised of a support boom 12 having a first end 14 and a second end 16. A cap 18 is attached to the first end 14 of the support boom 12 such that a bolt 20 fixedly attaches the cap 18 to the support boom 12. A first attachment leg 22 extends diagonally downwardly from the cap 18, the first attachment leg 22 having a first opening 24. The first attachment leg 22 and the cap 18 may be of monolithic construction. A typical hoist slip 26 having a horn 28 is fixedly attached to the second end 16 of the support boom 12 by a second bolt 30. A bearing collar 32 is located medially of the cap 18 and the hoist slip 26. A second attachment leg 34 extends diagonally downwardly from the bearing collar 32, the second attachment leg 34 having a second opening 36, and also being generally parallel with the first attachment leg 22. A support arm 38 extends outwardly from the bearing collar 32 and has a third opening 40. The bearing collar 32, the second attachment leg 34, and the support arm 38 may all be of monolithic construction. An anti-rotation torque arm 42 has a third end 44 and a fourth end 46 such that a first attachment collar 48 is attached to the third end of the torque arm 42 and a second attachment collar 50 is attached to the fourth end 46 of the torque arm 42. As seen, the second attachment collar 50 may be threadably attached to the torque arm 42, allowing fine length adjustment of the torque arm 42, while the first attachment collar 48 may be similarly attached or be fixedly attached to the torque arm 42 in appropriate fashion. The two attachment collars 48 and 50 each have a pair of corresponding openings 52 thereon. The torque arm 42 is attached to the support arm 38 by aligning the third opening 40 of the support arm 38 with the corresponding pair of openings 52 of the first attachment collar 48 and passing a pin 54 through the aligned openings 40 and 52, the pin 54 being cottered in place in appropriate fashion.

The various components of the hoist support removably mountable externally onto a helicopter 10 including the support boom 12, the first attachment leg 22, the second attachment leg, the support arm 38, and the torque arm 42, are all made from a durable lightweight material, such as high strength aluminum, titanium, a composite, etc.

In order to use the hoist support removably mountable externally onto a helicopter 10 of the present invention, the desired length of torque arm 42 is selected and is attached to the support arm 32 as described above. The hoist support removably mountable externally onto a helicopter 10 is positioned such that that first opening 24 of the first attachment leg 22 aligns with the opening (not separately labeled) on the upper forward External Stores Support System fitting 56 of a helicopter 58 and a pin 60 is passed through the aligned openings. Similarly, the second opening 36 of the second attachment leg 34 aligns with the opening (not separately labeled) on the upper aft External Stores Support System fitting 62 and a pin 64 passes through the aligned openings. The second attachment collar 50 of the torque arm 42 is attached to the tie-down ring fitting 66 of the aircraft 58 by passing a bolt 68 through the aligned ring fitting 66 and the pair of corresponding openings 52 of the lower attachment collar 50. The hoist 70 is attached to the horn 28 of the hoist slip 26 in the usual way and the hoist 70 is ready for use. To remove the hoist support removably mountable externally onto a helicopter 10, the attachment procedure is simply reversed by removing the bolt 68 from the tie-down ring fitting 66 and the torque arm 42, removing the pin 64 from the second attachment leg 34 and the upper aft External Stores Support System fitting 62, and removing the pin 60 from the first attachment leg 22 and the upper forward External Stores Support System fitting 56.

While the invention has been particularly shown and described with reference to an embodiment thereof, it will be appreciated by those skilled in the art that various changes in form and detail may be made without departing from the spirit and scope of the invention.

I claim:

1. A support system for attachment to the External Stores Support System of an aircraft, the support system comprising:
    a boom having a first end, a second end, and a medial section;
    a first leg extending diagonally downwardly from the first end of the boom;
    a second leg extending diagonally downwardly from the medial section of the boom;
    a torque arm attached to the medial section of the boom;
    a hoist slip having a horn and attached to the second end of the boom; and
    wherein the first leg is attached to a forward fitting of the External Stores Support System, the second leg is attached to an aft fitting of the External Stores Support System, and the torque arm is attached to a tie-down ring fitting;
    wherein the support system is installed on an aircraft.

2. The support system as in claim 1 wherein the length of the torque arm is variable.

3. The support system as in claim 1 wherein the first leg is attached to the boom via a cap.

4. The support system as in claim 3 wherein the second leg and the torque arm are each attached to the boom by a collar.

5. A support system for attachment to the External Stores Support System of an aircraft, the support system comprising:
    a boom having a first end, a second end, and a medial section;
    a first leg extending diagonally downwardly from the first end of the boom;
    a collar having an opening such that the boom passes through the opening of the collar;
    a second leg extending diagonally downwardly from the collar;
    a support arm extending outwardly from the collar;
    a torque arm attached to the collar;
    a hoist slip having a horn and attached to the second end of the boom; and
    wherein the first leg is attached to a forward fitting of the External Stores Support System, the second leg is attached to an aft fitting of the External Stores Support System, and the torque arm is attached to a tie-down ring fitting;
    wherein the support system is installed on an aircraft.

6. The support system as in claim 5 wherein the length of the torque arm is variable.

7. The support system as in claim 5 wherein the first leg is attached to the boom via a cap.

\* \* \* \* \*